United States Patent
Hayashi et al.

(10) Patent No.: US 8,340,347 B2
(45) Date of Patent: Dec. 25, 2012

(54) INFORMATION PROCESSING APPARATUS AND INFORMATION PROCESSING METHOD

(75) Inventors: Junichi Hayashi, Kamakura (JP); Yoshiharu Imamoto, Tokyo (JP); Nobuhiro Tagashira, Nagareyama (JP); Kazuya Kishi, Yokohama (JP); Yasuhiro Nakamoto, Kawasaki (JP); Kazuomi Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 533 days.

(21) Appl. No.: 12/624,293

(22) Filed: Nov. 23, 2009

(65) Prior Publication Data

US 2010/0135526 A1    Jun. 3, 2010

(30) Foreign Application Priority Data

Nov. 28, 2008  (JP) ................. 2008-304606
Sep. 4, 2009   (JP) ................. 2009-204721

(51) Int. Cl.
*G06K 9/00*      (2006.01)

(52) U.S. Cl. ........................................ 382/100

(58) Field of Classification Search .................. 382/100
See application file for complete search history.

(56) References Cited

U.S. PATENT DOCUMENTS

| | | | |
|---|---|---|---|
| 5,499,294 A | 3/1996 | Friedman | |
| 5,680,478 A | 10/1997 | Wang et al. | |
| 5,680,479 A | 10/1997 | Wang et al. | |
| 6,081,616 A | 6/2000 | Vaezi et al. | |
| 6,115,497 A | 9/2000 | Vaezi et al. | |
| 6,285,776 B1* | 9/2001 | Rhoads | 382/100 |
| 6,771,795 B1* | 8/2004 | Isnardi | 382/100 |
| 6,954,541 B2* | 10/2005 | Fan et al. | 382/100 |
| 7,194,630 B2 | 3/2007 | Iwamura et al. | |
| 2003/0123698 A1* | 7/2003 | Murakami | 382/100 |

FOREIGN PATENT DOCUMENTS

| | | |
|---|---|---|
| JP | 06-068301 A | 3/1994 |
| JP | 2003-298579 A | 10/2003 |

* cited by examiner

*Primary Examiner* — Tom Y Lu

(74) *Attorney, Agent, or Firm* — Carter, DeLuca, Farrell & Schmidt LLP

(57) ABSTRACT

This invention provides a technique of preventing determination of image alteration when digital image data has undergone, e.g., rotation without any substantial change in contents. To do this, an area separation processing unit separates image data into areas. For each of the separated areas, an area feature value calculator calculates an area feature value independent of the coordinate information of the image. An area order sorter sorts the separated areas in accordance with the calculated area feature values. A validation data generation processing unit generates validation data based on the sort result.

22 Claims, 15 Drawing Sheets

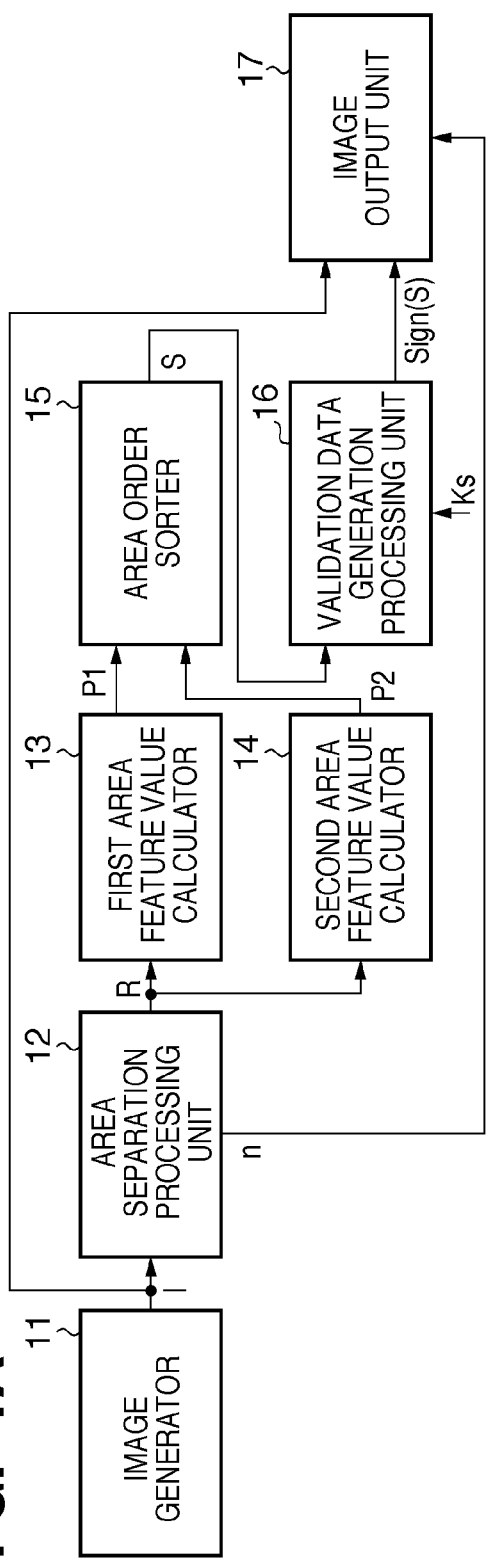
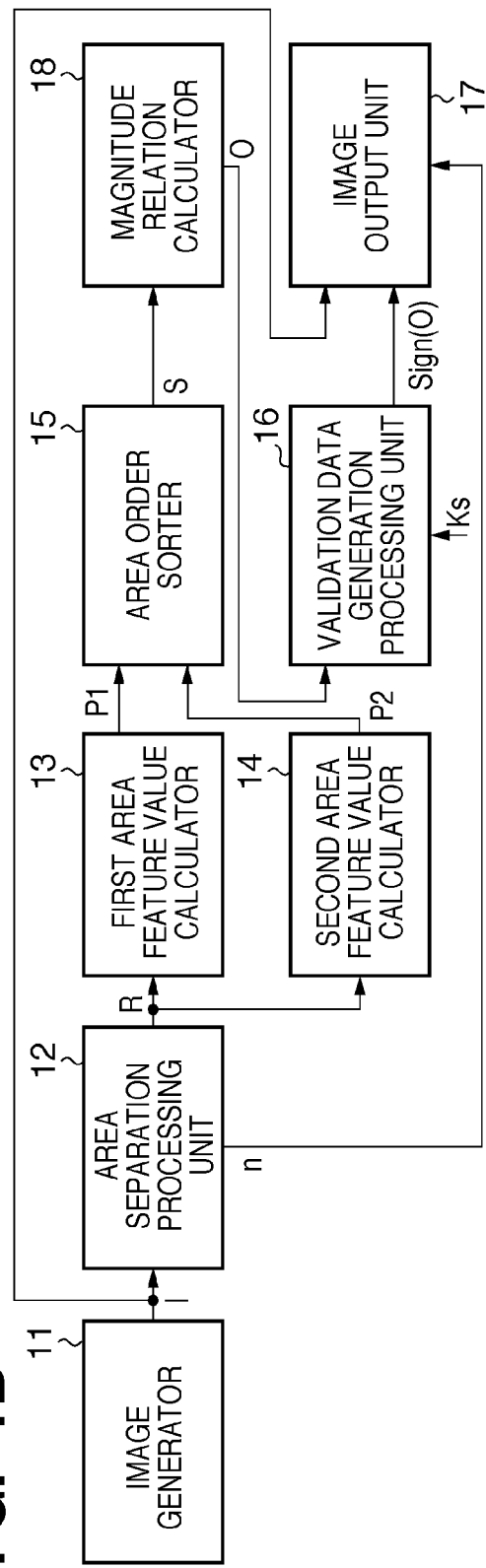

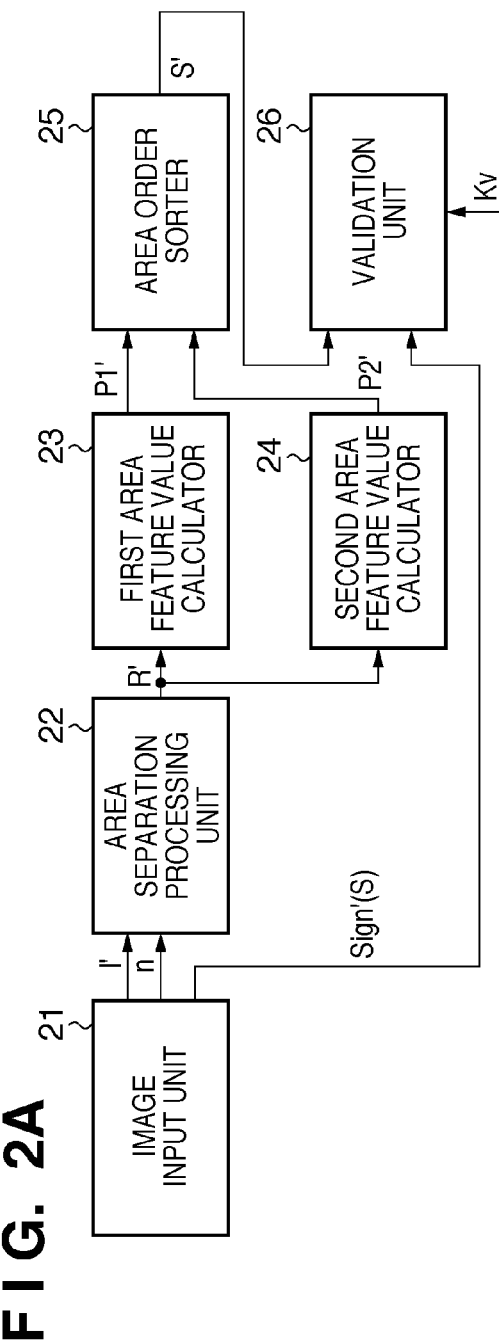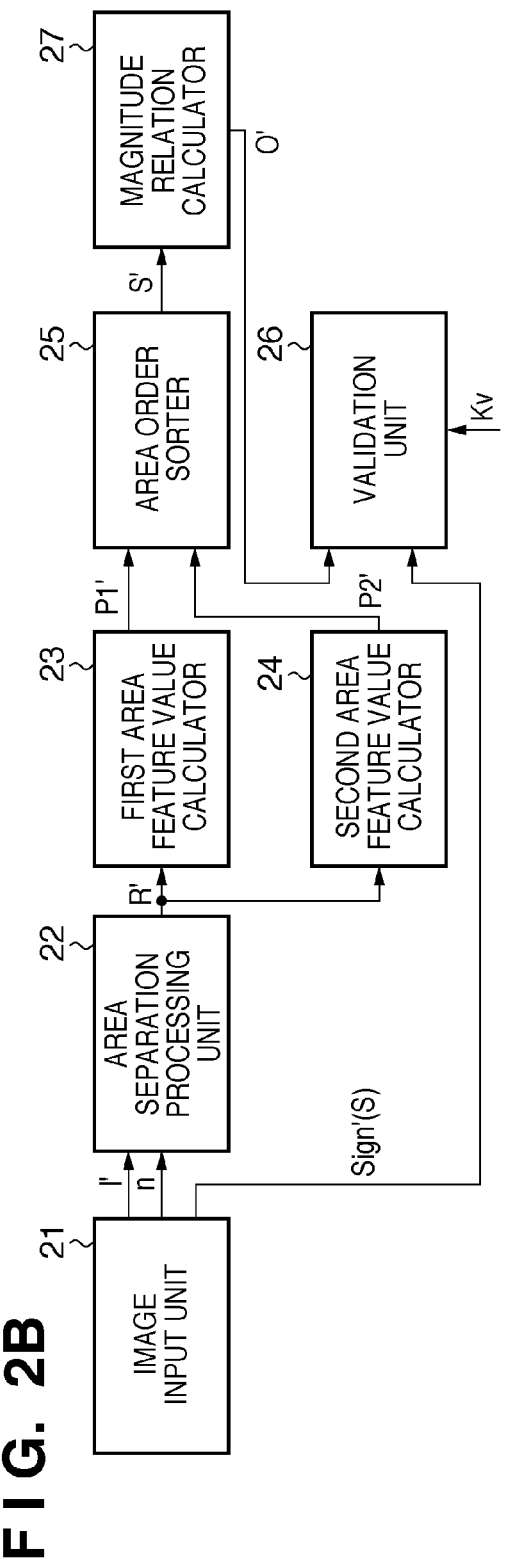

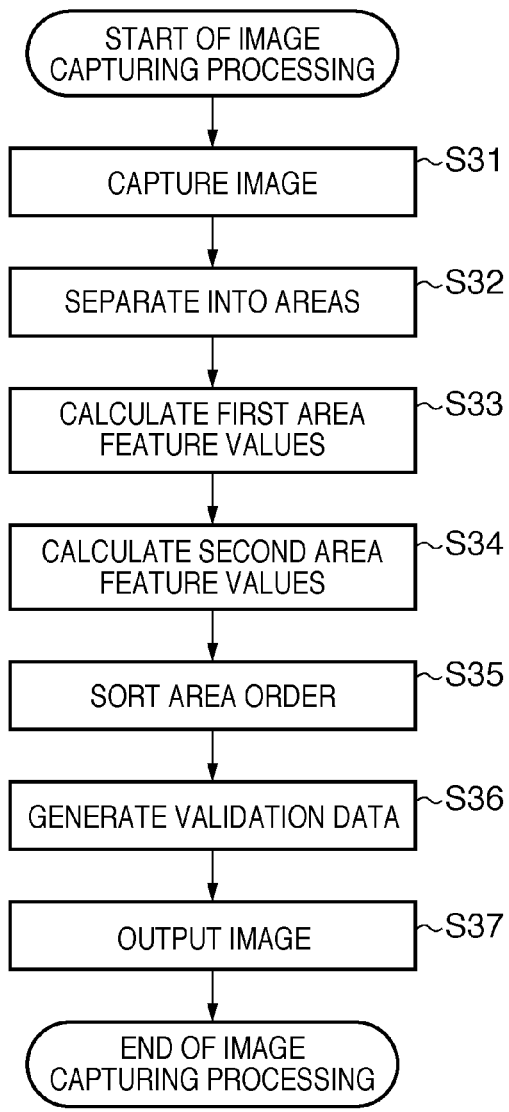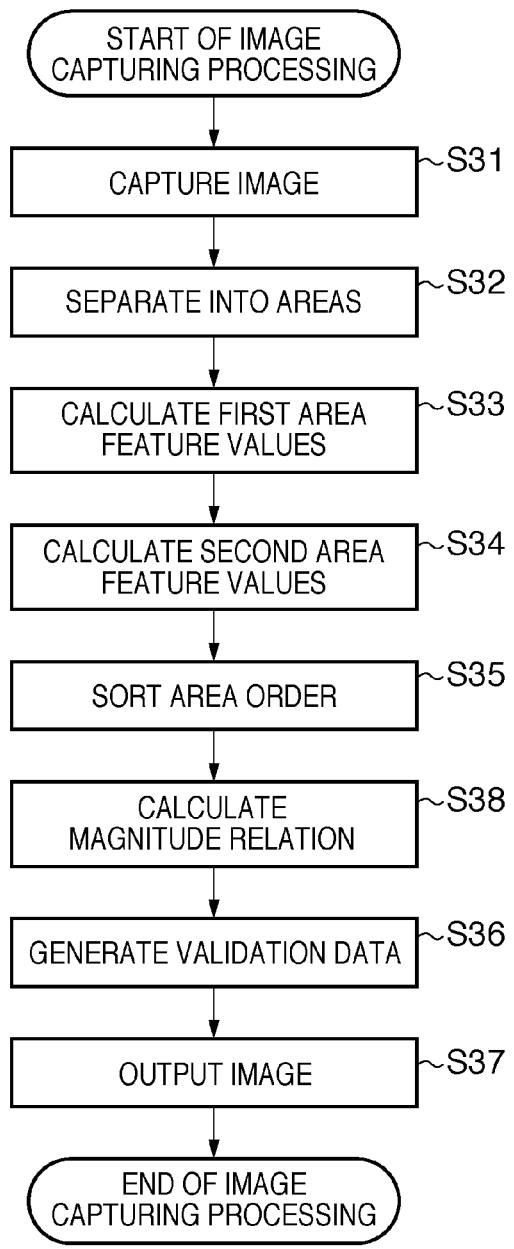

FIG. 5

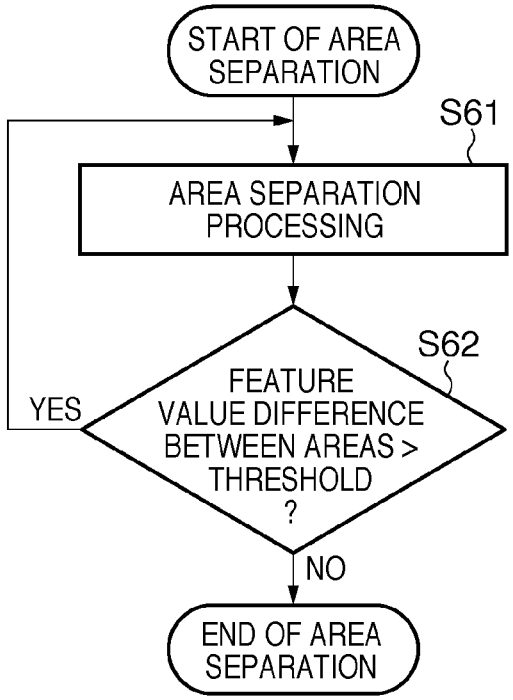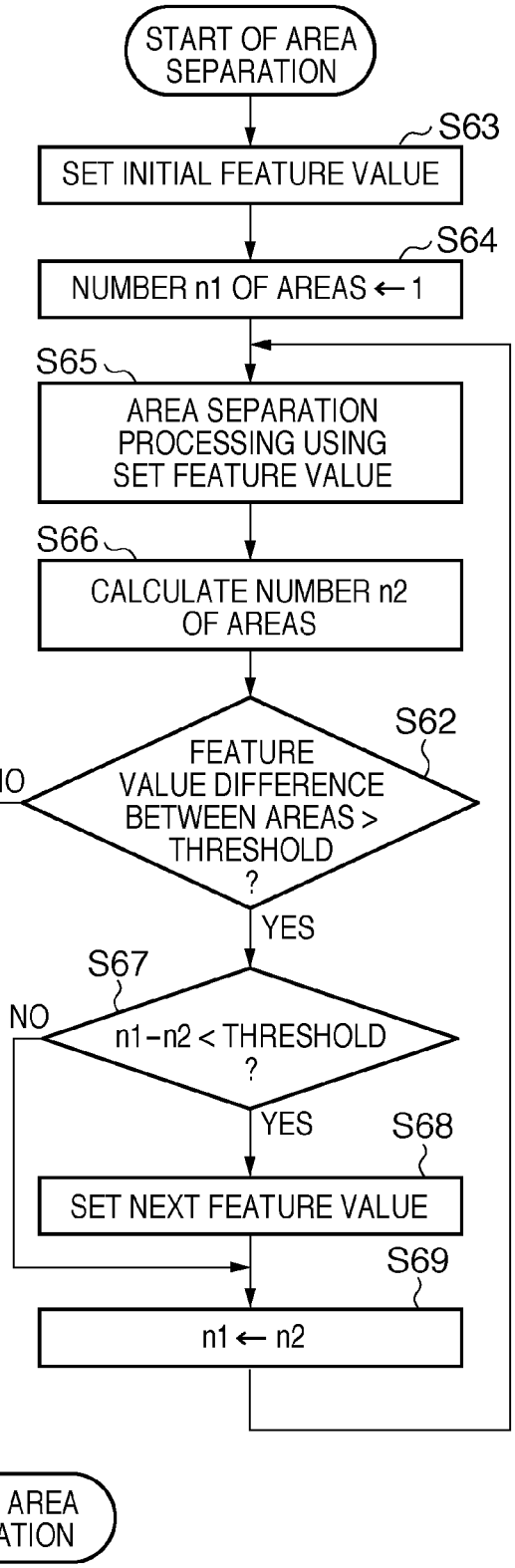

FIG. 10
| VALIDATION TARGET IMAGE | AREA SEPARATION RESULT | SORT RESULT OF FIRST AREA FEATURE VALUES (SORTED IN DESCENDING ORDER) | SORTED SECOND AREA FEATURE VALUES |
|---|---|---|---|
| 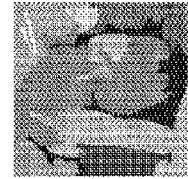 | 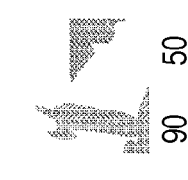 | 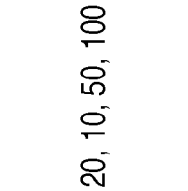 100　90　50　45　40　30　25 | 130, 180, 190, 120, 10, 50, 100 |

FIG. 12A

| AREA | 1 | 2 | 3 | 4 | 5 | 6 | 7 |
|---|---|---|---|---|---|---|---|
| P1 | 90 | 100 | 50 | 45 | 25 | 30 | 40 |
| P2 | 180 | 130 | 190 | 120 | 100 | 50 | 10 |

121 — AREA
122 — P1
123 — P2

FIG. 12B

| AREA | 2 | 1 | 3 | 4 | 7 | 6 | 5 |
|---|---|---|---|---|---|---|---|
| (P1) | 100 | 90 | 50 | 45 | 40 | 30 | 25 |
| S | 130 | 180 | 190 | 120 | 10 | 50 | 100 |

124 — AREA
125 — (P1)
126 — S

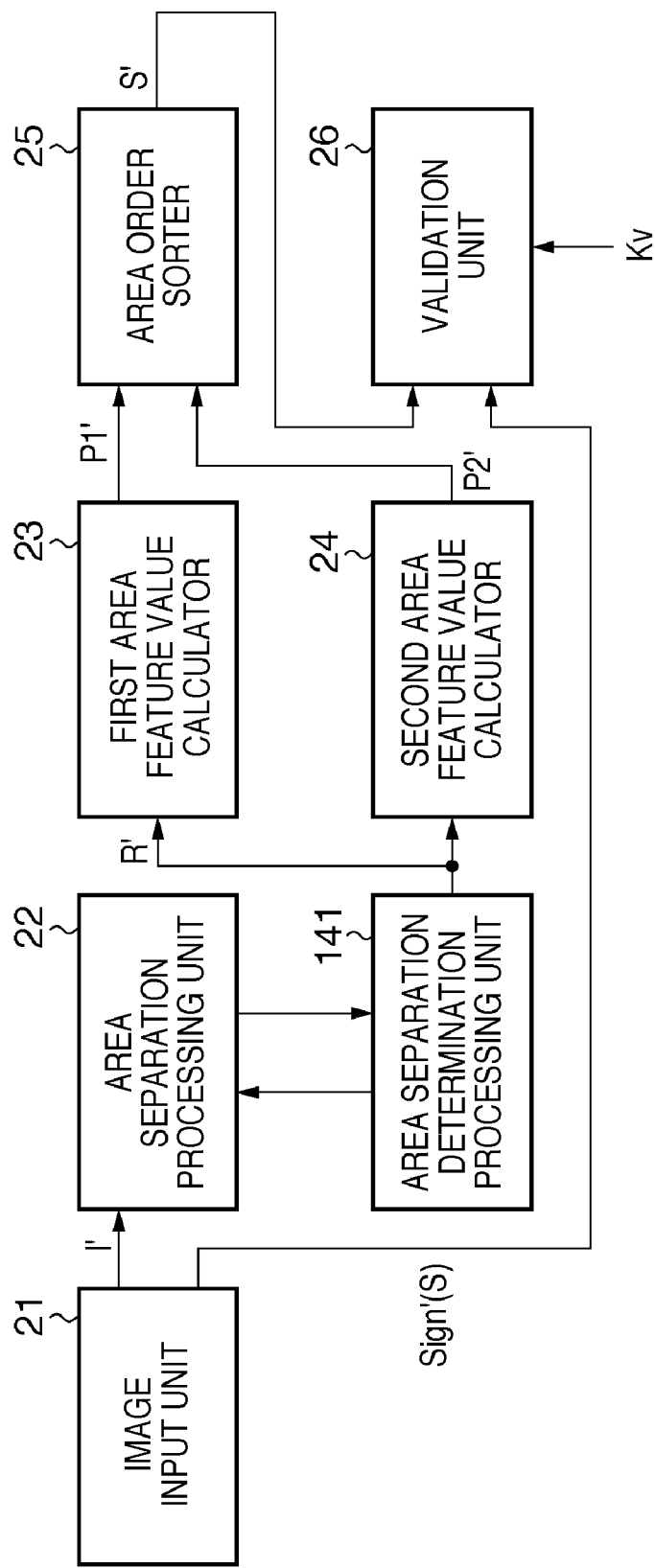

INFORMATION PROCESSING APPARATUS AND INFORMATION PROCESSING METHOD

BACKGROUND OF THE INVENTION

1. Field of the Invention

The present invention relates to a technique of guaranteeing the integrity of digital data.

2. Description of the Related Art

Digital cameras and the like are recently widespread, which record captured images in a recording medium not as conventional silver halide photos or 8-mm film but as digital image data. Insurance companies which handle photos of evidence in tasks concerning accidents or construction firms which handle the records of the progress at the sites of construction also think of using digital image data. However, digital image data is easy to alter using, e.g., a commercially available photo retouch tool. For this reason, digital image data is less reliable than conventional silver halide photos and therefore poor in capability as evidence. To solve this matter, a method as disclosed in patent reference 1 has been proposed. According to this reference, a digital camera holds secret information in advance. Upon capturing an image, the digital camera signs the digital image data using the secret information. After the image capturing, validation processing is performed using the generated signature information, thereby guaranteeing the integrity of the digital image data.

According to the technique of U.S. Pat. No. 5,499,294, if at least one bit of digital image data has been changed, it is determined by validation processing that "the image data has been altered". Hence, even if the contents of digital image data have not substantially been changed (for example, when image processing such as enlargement/reduction or rotation has been performed), it is determined by validation processing that "the image data has been altered".

To solve this matter, a method disclosed in Japanese Patent Laid-Open No. 2003-298579 has been proposed. According to this reference, signature information is generated based on the feature amount of captured image data, instead of directly generating it from digital image data. In this technique, if the feature amount after image processing is the same as that before image processing, it is determined by validation processing that "the image data has not been altered". In this reference, to ensure tolerance of reduction processing of digital image data, the coefficient of a low frequency component in a wavelet transformation domain is used as the feature amount.

There is conventionally no suitable alteration validation technique of correctly determining that "image data has not been altered" when digital image data has undergone only rotation without any substantial change in contents.

SUMMARY OF THE INVENTION

According to an aspect of the present invention, an apparatus for generating validation data to validate alteration of image data includes a calculator which calculates a feature value of an image represented by the image data, the feature value being unchangeable when the image rotates; and a validation data generator which generates, based on the calculated feature value, validation data to validate alteration of the image data.

Further features of the present invention will become apparent from the following description of exemplary embodiments (with reference to the attached drawings).

BRIEF DESCRIPTION OF THE DRAWINGS

FIGS. 1A and 1B are block diagrams for explaining arrangements of an image input apparatus according to the first embodiment;

FIGS. 2A and 2B are block diagrams for explaining arrangement of an image validation apparatus according to the first embodiment;

FIGS. 3A and 3B are flowcharts illustrating procedures of image input processing according to the first embodiment;

FIG. 5 is a view for explaining an example of validation processing according to the first embodiment;

FIGS. 6A to 6C are flowcharts for explaining the procedure of area separation processing and a view showing a feature value list according to the second embodiment, respectively;

FIG. 10 is a view for explaining an example of validation processing according to the first embodiment;

FIGS. 12A and 12B are views for explaining first area feature values and second area feature values according to the first embodiment;

FIG. 14 is a block diagram for explaining the arrangement of an image validation apparatus according to the second embodiment;

DESCRIPTION OF THE EMBODIMENTS

Figure 8:
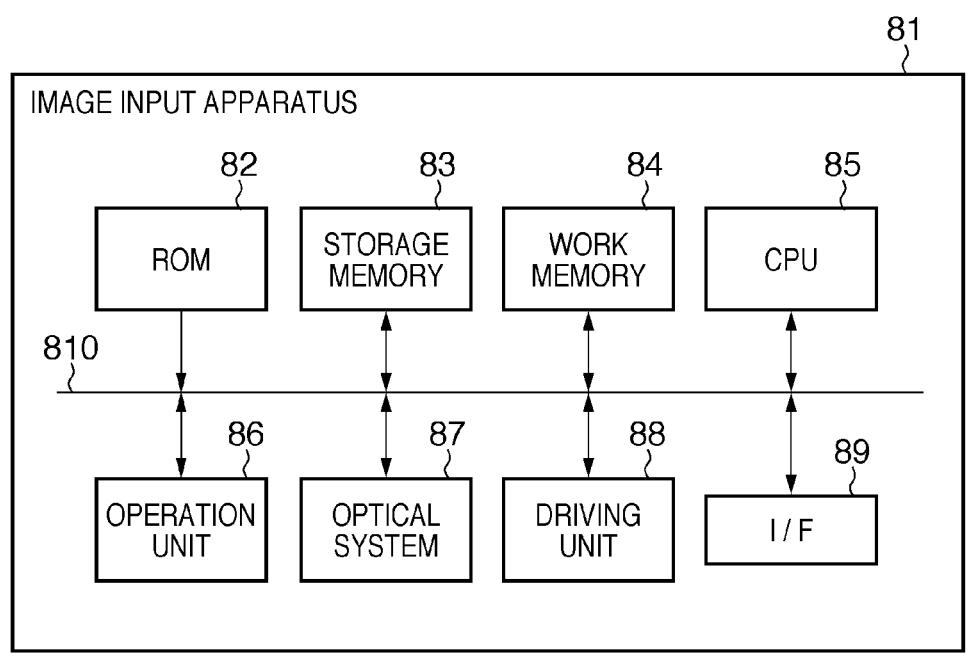
FIG. 8 is a block diagram for explaining the arrangement of the image input apparatus according to the first embodiment.

Hereinafter, a first embodiment is described. An image input apparatus adaptable to this embodiment will be described first with reference to FIG. 8. FIG. 8 is a block diagram showing the basic arrangement of an image input apparatus (information processing apparatus) adaptable to this embodiment. As shown in FIG. 8, an image input apparatus 81 according to this embodiment includes a ROM 82, storage memory 83, work memory 84, CPU 85, operation unit 86, optical system 87, driving unit 88, and I/F 89. These units are connected by a bus 810.

The image input apparatus 81 is, e.g., a common digital camera which can store, in the storage memory 83 or the like, digital image data generated by the optical system 87 upon receiving an image capturing instruction input via the operation unit 86. Referring to FIG. 8, the ROM 82 is a read only memory which stores operation programs and shared information used for validation data generation in advance. The storage memory 83 stores processed image data. The work memory 84 temporarily stores image data. Compression and various kinds of arithmetic processes of the image data are executed on the work memory 84. Upon receiving an image capturing instruction, the CPU 85 performs various kinds of arithmetic processes such as image data compression processing and validation data generation in accordance with a program stored in the ROM 82 in advance. The operation unit 86 serves as a user interface to receive various kinds of instructions represented by an image capturing instruction from a user and various parameter settings. The optical system 87 includes an optical sensor using, e.g., as a charge coupled device (CCD) or a complementary metal oxide semiconductor (CMOS). When an image capturing instruction is input, the optical system 87 captures an object and performs electrical signal processing, digital signal processing, and the like. The driving unit 88 performs mechanical operations used for image capturing under the control of the CPU 85. The I/F 89 is an interface to an external device such as a memory card, a portable terminal, or a communication device and is used to transmit image data or validation data to these devices.

Figure 9:
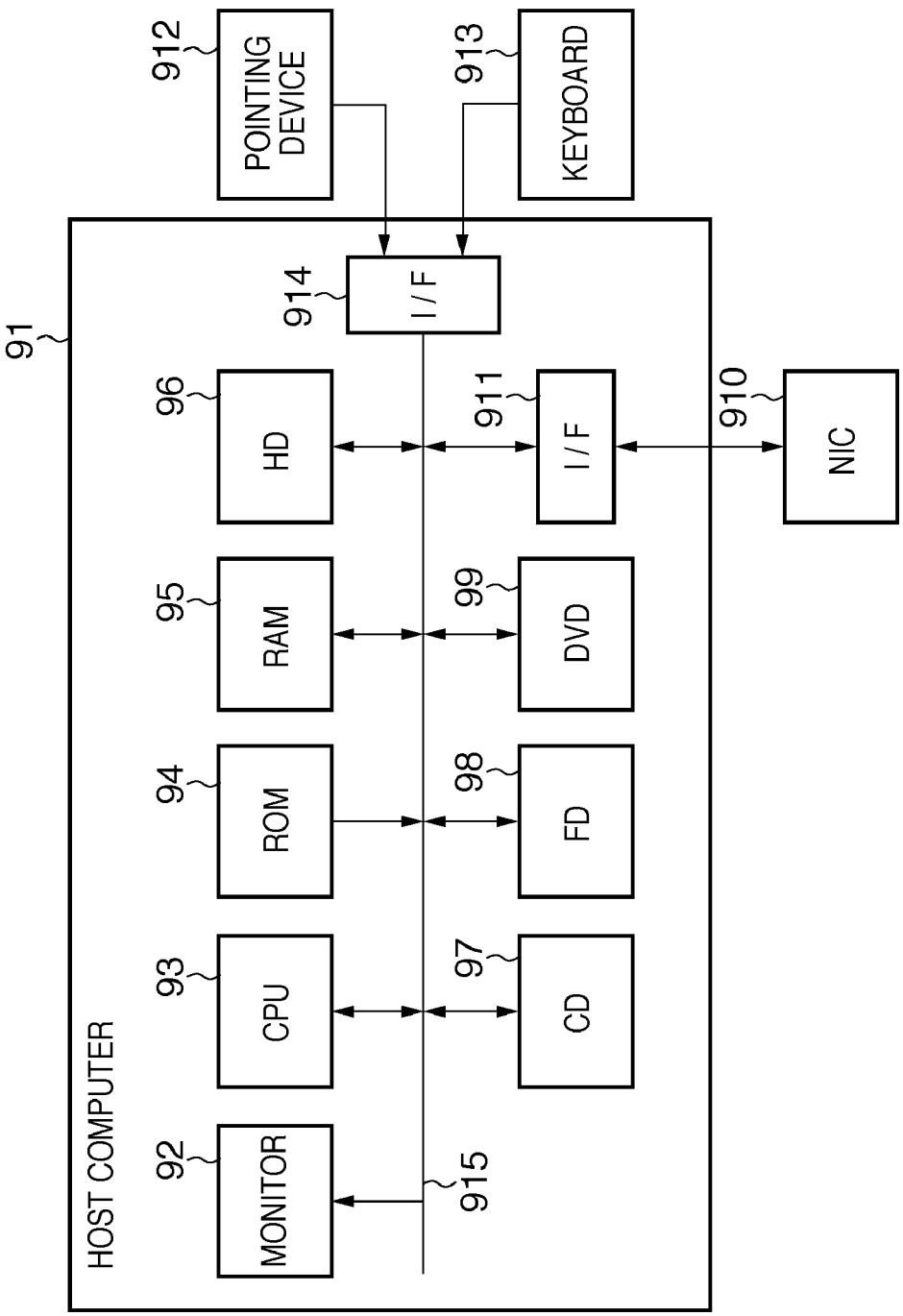
FIG. 9 is a block diagram for explaining the arrangement of a computer according to the first embodiment.

A host computer adaptable to this embodiment will be explained next with reference to FIG. 9. FIG. 9 is a block diagram showing the basic arrangement of a host computer functioning as an image validation apparatus (information processing apparatus) according to this embodiment and the relation to its peripheral device.

Referring to FIG. 9, a host computer 91 is, e.g., a common personal computer. The host computer 91 can accumulate image data in an HD (Hard Disk) 96, CD 97, FD 98, or DVD 99 or display accumulated image data or the like on a monitor 92. The host computer 91 can also distribute these image data via, e.g., the Internet using a NIC 910. Various user instructions are input from a pointing device 912 or a keyboard 913. A bus 915 connects blocks to be described later inside the host computer 91 to enable transfer of various data. Referring to FIG. 9, the monitor 92 can display various kinds of information from the host computer 91. A CPU 93 can control the operations of the units in the host computer 91 or execute a program loaded to a RAM 95. A ROM 94 stores a BIOS and boot programs. The RAM 95 temporarily stores programs and process target image data for processing of the CPU 93. The OS and programs to be used by the CPU 93 to execute various kinds of processing to be described later are loaded to the RAM 95. The HD 96 stores the OS and programs to be transferred to the RAM or the like and is also used by the apparatus to store or read out image data during the operation. The CD-ROM drive 97 can read out data from a CD-ROM (or CD-R or CD-R/W) that is an external storage medium, or write data on it. The FD drive 98 can also read- and write-access an FD (Floppy® disk), like the CD-ROM drive 97. The DVD-ROM (DVD-RAM) drive 99 can also read-access a DVD-ROM or write-access a DVD-RAM, like the CD-ROM drive 97. Note that when programs for image processing are stored on a CD-ROM, FD, or DVD-ROM, these programs are installed in the HD 96 and transferred to the RAM 95 as needed. An I/F 911 connects the host computer 91 to the NIC 910 which connects, to a network such as the Internet, image data stored in the RAM 95, HD 96, CD-ROM 97, FD 98, or DVD 99. The host computer 91 transmits or receives data to or from the Internet via the I/F 911. An I/F 914 connects the pointing device 912 and the keyboard 913 to the host computer 91. Various kinds of instructions input from the pointing device 912 or the keyboard 913 are input to the host computer 91 via the I/F 914.

The image input processing unit (function) of the image input apparatus 81 applied to the embodiment will be described below with reference to FIG. 1A. Note that functions available when the above-described image input apparatus 81 is powered on, and the OS is loaded to the work memory 84 will be explained below.

The present invention is not limited to this, and the processing can be executed by the above-described host computer 91. In this case, the respective processing units are implemented by corresponding programs, the CPU 93 which executes the programs, and peripheral hardware as needed.

As shown in FIG. 1A, the image input apparatus 81 according to this embodiment includes an image generator 11, area separation processing unit 12, first area feature value calculator 13, second area feature value calculator 14, area order sorter 15, validation data generation processing unit 16, and image output unit 17. Note that image input processing to be explained here may be implemented by software processing. In that case, the above-described units should be regarded as the concepts of functions used for the processing.

Referring to FIG. 1A, the image generator 11 includes an optical sensor using, e.g., CMOS (complementary metal oxide semiconductor) or CCD (charge coupled device) in the optical system 87, and a microprocessor for controlling the optical system. The image generator 11 acquires, as image information, a video signal generated by the optical system and the optical sensor, and forms image data I. The image data I generated by the image generator 11 is output to the area separation processing unit 12 and the image output unit 17 of the succeeding stage.

The area separation processing unit 12 receives the image data I generated by the image generator 11 of the preceding stage, executes area separation processing of the received image data I, and outputs an area separation result R. The area separation processing unit 12 can automatically execute the area separation processing by referring to attributes such as color information and brightness information. The shape of a separated area is not particularly defined, and separation is only being performed using the above-described attributes for area separation. The area separation processing can be done using an integration approach which repeatedly integrates subareas having similar features or a separation approach which starts from a whole image and repeatedly separates the image unless the features are uniform. An example of area separation processing is the k-means algorithm which is known well as an area separation method using color information or brightness information. An area separation method using the region growing method or watershed transformation is also known. The k-means algorithm and area separation using the region growing method or watershed transformation are well-known techniques for those skilled in the art, and a detailed description thereof will be omitted.

The first area feature value calculator 13 receives the area separation result R of division by the area separation processing unit 12 of the preceding stage, calculates the first area feature value of each area based on the received area separation result R, and outputs calculated first area feature values P1. In this embodiment, the area of each area is applied as the first area feature value. However, the present invention is not limited to this. More specifically, various feature values are applicable as the first area feature value if they do not change even after rotation of an image (or each area of an image) (do not depend on the coordinates of an image and are independent of the coordinate information of the image). Examples other than the area will be listed below.

"Peripheral length" corresponding to the number of contour pixels of each area.

Degree of complexity corresponding to the complexity (degree of unevenness) of contour shape (a value obtained by, e.g., (peripheral length)$^2$÷area or peripheral length÷area).

Degree of elongation corresponding to the degree of slimness of each area (a value obtained by area÷width; the width is calculated as, e.g., the average value of widths measured along the centerline of an area);

Average value of brightness information or color information.

Variance of brightness information or color information.

A combination of the above feature values.

The second area feature value calculator 14 receives the area separation result R of division by the area separation processing unit 12 of the preceding stage, calculates the second area feature value of each area based on the received area separation result R, and outputs calculated second area feature values P2. In this embodiment, the average value of the brightness values of each area is applied as the second area feature value. However, the present invention is not limited to this. More specifically, various feature values are applicable as the second area feature value if they do not change even after rotation of an image, like the first area feature values P1. Note that the first area feature value P1 and the second area feature value P2 are feature values of different types here.

The area order sorter 15 receives the first area feature values P1 and the second area feature values P2 calculated by the first area feature value calculator 13 and the second area feature value calculator 14 of the preceding stage, respectively. The area order sorter 15 sorts the second area feature values P2 using the relative relation of the first area feature values P1, and outputs sorted second area feature values S. A series of processes in the first area feature value calculator 13, second area feature value calculator 14, and area order sorter 15 will be described here using an example shown in FIGS. 12A and 12B.

Referring to FIG. 12A, 121 represents an area number assigned to each of separated areas; 122, the first area feature value P1 calculated by the first area feature value calculator 13; and 123, the second area feature value P2 calculated by the second area feature value calculator 14. The area order sorter 15 receives the first area feature values P1 and the second area feature values P2 and sorts the areas based on the first area feature values P1. FIG. 12B shows the sort result. In the example of FIG. 12B, the areas are sorted in descending order (125 in FIG. 12B) of the first area feature values P1. As the result of sort, the areas are rearranged in the order of "2, 1, 3, 4, 7, 6, 5", as indicated by 124. Finally, the area order sorter 15 outputs "130, 180, 190, 120, 10, 50, and 100" as the sorted second area feature values S, as indicated by 126. In this embodiment, sorting is performed in descending order. However, the present invention is not limited to this. Sorting in ascending order and various kinds of other sorting methods of arranging areas in accordance with a predetermined rule are also included, as a matter of course. The validation data generation processing unit 16 receives the sorted second area feature values S output from the area order sorter 15 of the preceding stage. The validation data generation processing unit 16 then generates validation data Sign(S) based on a signature key Ks and the received sorted second area feature values S, and outputs the generated validation data Sign(S). A MAC (Message Authentication Code), a digital signature, or the like is applicable as the validation data of this embodiment. Methods of generating a MAC or a digital signature are well-known techniques for those skilled in the art, and a detailed description thereof will be omitted. When a MAC is applied as the validation data, secret information for generating the MAC is input as the signature key Ks and used for MAC generation. The image input apparatus and the image validation apparatus to be described later share the signature key Ks. To do this, the ROM 82 in the image input apparatus and the ROM 94 in the image validation apparatus hold common secret information in advance. The validation data generation processing unit 16 uses the secret information as needed. Alternatively, the signature key Ks may be held in a tampering-resistant device such as an IC card. The IC card is connected to the image input apparatus and the image validation apparatus, and the validation data generation processing unit 16 may acquire and use the signature key Ks in the IC card. Otherwise, new secret information may be generated in the image input apparatus and used as the signature key Ks. In this case, the generated secret information is held in a tampering-resistant device such as an IC card or encrypted and transmitted to the image validation apparatus. On the other hand, when a digital signature is applied as the validation data, secret information for generating the digital signature is input as the signature key Ks. To do this, the ROM 82 in the image input apparatus holds the signature key Ks in advance. The validation data generation processing unit 16 uses the signature key Ks as needed. Alternatively, the signature key Ks may be held in a tampering-resistant device such as an IC card. The IC card is connected to the image input apparatus, and the validation data generation processing unit 16 may acquire and use the signature key Ks in the IC card. Otherwise, a new signature key Ks may be generated in the image input apparatus and used. In any case, a public key corresponding to the signature key Ks used by the validation data generation processing unit 16 in the image validation apparatus is to be described later. For this reason, the image output unit 17 of the succeeding stage adds the public key corresponding to the signature key Ks to the image data and transmits it to the image validation apparatus. Alternatively, the public key is held on a server (not shown). Information (e.g., URL) representing the public key holding position on the server is recorded in the image data. The image validation apparatus may acquire the public key from the server as needed using the information representing the holding position.

Note that in this embodiment, a MAC or a digital signature is generated from the sorted second area feature values S as validation data. However, the present invention is not limited to this. For example, the input sorted second area feature values S may directly be used as validation data. Alternatively, for example, the input sorted second area feature values S are encrypted using secret information shared by the image validation apparatus in advance, and the encrypted sorted second area feature values S may be used as validation data.

The image output unit 17 receives the image data I output from the image generator 11 of the preceding stage and the validation data Sign(S) output from the validation data generation processing unit 16. The image output unit 17 adds the validation data Sign(S) to the image data I and outputs it. In this embodiment, the validation data Sign(S) is added by recording it in the header of the image data I formatted to Exif or the like. However, the present invention is not limited to this. Various methods are available to add the validation data Sign(S) to the image data I. For example, the validation data Sign(S) may be concatenated to the end of the image data I. In this embodiment, the image output unit 17 may acquire, from the area separation processing unit 12, the number n of areas separated by it, and add the number n of areas to the image data I. The number n of areas is added to the image data I, and an area separation processing unit 22 of the image validation apparatus (FIG. 2A or 2B) to be described later separates the image into areas in number equal to the number n of areas. At this time, the image input apparatus and the image validation apparatus readily obtain the same area separation result.

Alternatively, instead of adding the number n of areas to the image data I, the image input apparatus and the image validation apparatus may share the number n of areas in advance and perform area separation processing based on the shared number n of areas.

Figure 17:
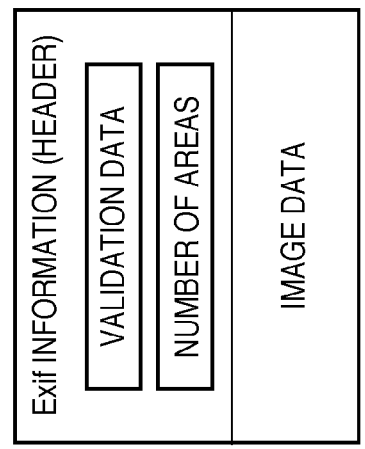
FIG. 17 is a view for explaining the format of image data according to the embodiment.

FIG. 17 is a view illustrating the format of data output from the image output unit 17. As shown in FIG. 17, the validation data Sign(S) and the number n of areas are recorded in the header portion of image data formatted to Exif or the like, and output together with the image data. The image output unit 17 records the image data I in a storage medium such as a removable medium or transmits the image data I to a predetermined host via a wired or wireless network.

The procedure of image capturing processing to be executed by the image input apparatus of this embodiment will be explained below with reference to FIG. 3A. FIG. 3A is a flowchart illustrating the procedure of the image capturing processing. First, the image generator 11 obtains the image data I (S31, i.e., capture image). The area separation processing unit 12 performs area separation processing of the image data I (S32, i.e., separate into areas). The first area feature value calculator 13 calculates the first area feature value P1 of each of the separated areas (S33). Similarly, the second area feature value calculator 14 calculates the second area feature value P2 of each of the separated areas (S34). The area order sorter 15 sorts the second area feature values P2 based on the first area feature values P1 (S35). The validation data generation processing unit 16 generates the validation data Sign(S) based on the sorted second area feature values S (S36). Finally, the image output unit 17 composites the image data I and the validation data Sign(S) and outputs them (S37, i.e., output image).

The image validation processing unit (function) of the image validation apparatus applied to the embodiment will be described below with reference to FIG. 2A. Note that a case will be described below in which the above-described host computer 91 is powered on, and the OS is loaded to the work area of the RAM 95. As shown in FIG. 2A, the image validation apparatus according to this embodiment includes an image input unit 21, area separation processing unit 22, first area feature value calculator 23, second area feature value calculator 24, area order sorter 25, and validation unit 26. Note that image validation processing to be explained here may be implemented by software processing. In that case, the above-described units should be regarded as the concepts of functions used for the processing. Referring to FIG. 2A, the image input unit 21 inputs image data I' output from the above-described image input apparatus. For easier understanding, assume that the image data I' output from the image input apparatus is input via a removable medium and/or a network. Note that in this embodiment, the image data I' is input to the image validation apparatus considering the possibility that the image data I output from the image input apparatus is altered halfway. The image input unit 21 also analyzes the header of the received image data I', extracts added validation data Sign'(S), and outputs the extracted validation data Sign'(S). In this embodiment, the validation data is represented by Sign'(S) considering the possibility that Sign(S) generated in the image input apparatus is altered halfway. Without alteration, Sign'(S) equals Sign(S). The processes to be executed in the area separation processing unit 22, first area feature value calculator 23, second area feature value calculator 24, and area order sorter 25 are the same as those in the area separation processing unit 12, first area feature value calculator 13, second area feature value calculator 14, and area order sorter 15 in FIG. 1A. Note that the area separation processing unit 22 may acquire, from the image input unit 21, the number n of areas added to the image data I and separate the image into areas in number equal to the number n of areas. At this time, the above-described image input apparatus and the image validation apparatus readily obtain the same area separation result. Alternatively, instead of adding the number n of areas to the image data, the image input apparatus and the image validation apparatus may share the number n of areas in advance and perform area separation processing based on the shared number n of areas. The validation unit 26 receives sorted second area feature values S' output from the area order sorter 25 of the preceding stage, the validation data Sign'(S) extracted by the image input unit 21, and a validation key Kv. Using the received data, the validation unit 26 validates whether the image data I' has been altered, and outputs the validation result (OK/NG). The validation processing executed by the validation unit 26 corresponds to the above-described validation data generation processing unit 16. More specifically, if the validation data generation processing unit 16 has generated a MAC, the validation unit 26 executes the validation processing using the MAC. If the validation data generation processing unit 16 has generated a digital signature, the validation unit 26 executes the validation processing using the digital signature. For the MAC, the validation key Kv is secret information identical to the signature key Ks applied by the validation data generation processing unit 16. For the digital signature, the validation key Kv should be considered as the public key corresponding to the signature key Ks applied by the validation data generation processing unit 16. Note that validation methods using a MAC or a digital signature are well-known techniques for those skilled in the art, and a detailed description thereof will be omitted.

Note that in this embodiment, the sorted second area feature values S' are validated using a MAC or a digital signature as validation data. However, the present invention is not limited to this. That is, the validation method is selected in accordance with the validation data generation method. For example, if the validation data corresponds to the input sorted second area feature values S themselves, the input sorted second area feature values S' themselves are used as validation data and compared, thereby validating alteration of the image data.

Figure 4A:
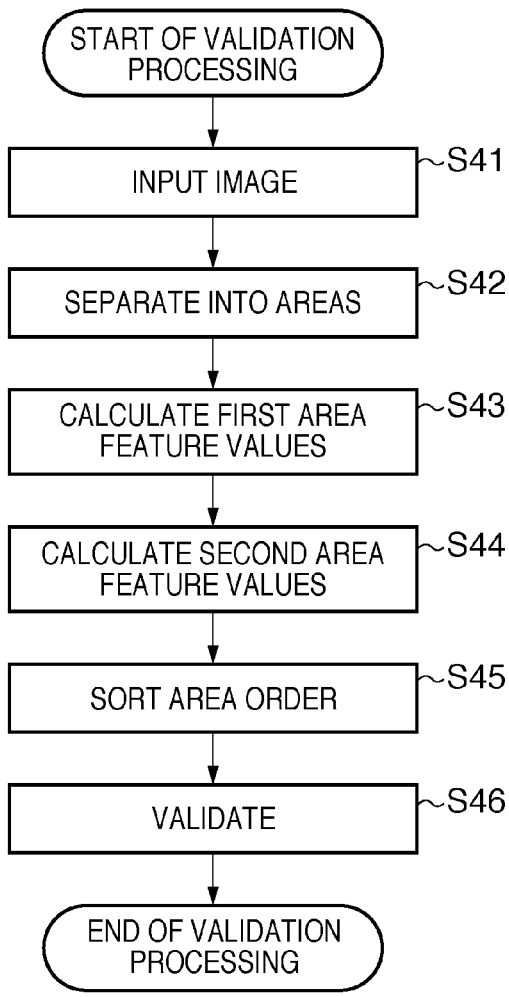
FIGS. 4A and 4B are flowcharts illustrating procedures of image validation processing according to the first embodiment.

The procedure of image validation processing to be executed by the image validation apparatus of this embodiment will be explained below with reference to FIG. 4A. FIG. 4A is a flowchart illustrating the procedure of the image validation processing applicable to the embodiment. First, the image input unit 21 inputs the image data I' (S41). The area separation processing unit 22 performs area separation processing of the image data I' (S42, i.e., separate into areas). The first area feature value calculator 23 calculates a first area feature value P1' of each of the separated areas (S43). Similarly, the second area feature value calculator 24 calculates a second area feature value P2' of each of the separated areas (S44). The area order sorter 25 sorts the second area feature values P2' based on the first area feature values P1' (S45). Using the sorted second area feature values S' and the validation data Sign'(S), the validation unit 26 validates the presence/absence of alteration of the image data I' (S46). According to this embodiment, validation data is generated from the sorted second area feature values S generated using the area separation processing unit 12, first area feature value calculator 13, second area feature value calculator 14, and area order sorter 15.

Figure 5:
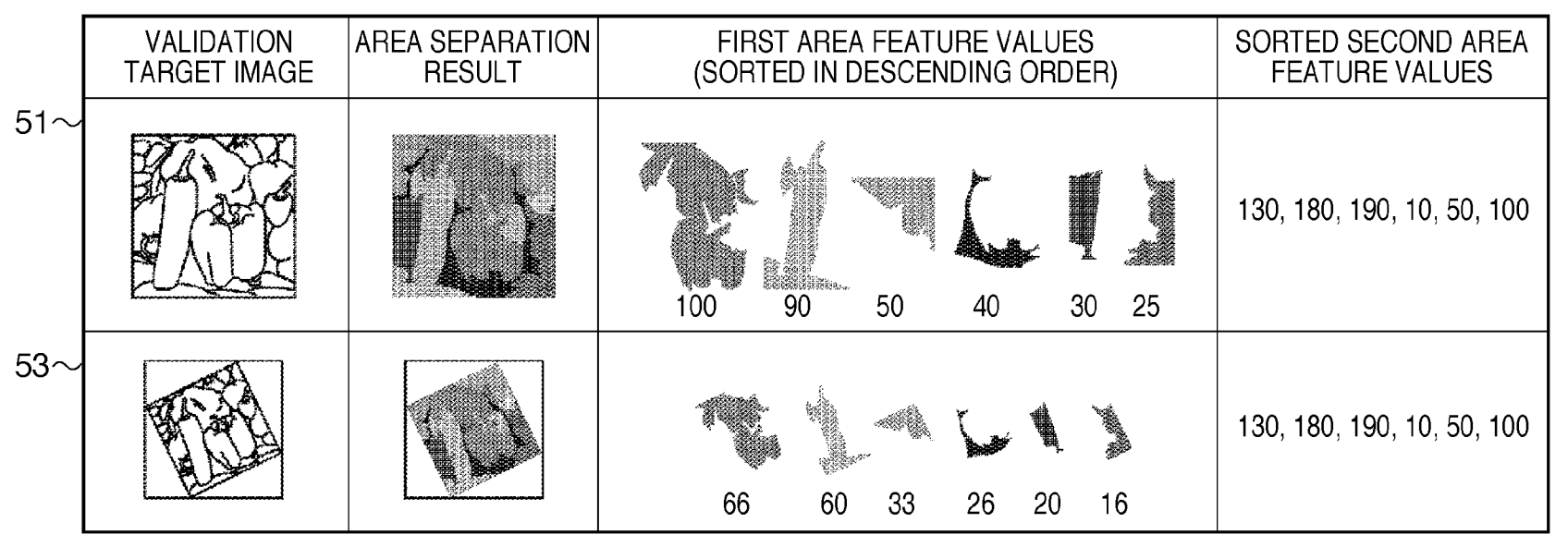

According to the above-described embodiment, validation processing can succeed even when the image data I has undergone rotation processing between the image input apparatus and the image validation apparatus. The principle will be explained using an example shown in FIG. 5. Referring to FIG. 5, rows 51 and 53 show various kinds of data concerning an original image and an image obtained by rotating the original image. The columns show, from the left, a validation target image, an area separation result, first area feature values, and sorted second area feature values. The validation target image corresponds to the image data I' in FIG. 2A. The area separation result corresponds to an area separation result R' in FIG. 2A. The first area feature values correspond to a state in which the first area feature values P1' in FIG. 2A are sorted in descending order in the area order sorter 25. The sorted second area feature values correspond to the sorted second area feature values S' in FIG. 2A. Regarding the first area feature values, a number under each area represents a first area feature value.

Note that in this embodiment, the area of each area is used as a first area feature value, and the average value of the brightness values of each area is used as a second area feature value. As for the area separation result, the rotated image 53 obtains the same area separation result as in the original image 51. That is, areas identical to those obtained from the original image can be obtained from the rotated image 53 as well. As for the first area feature values, the rotated image 53 obtains the same sort result as in the original image 51. That is, upon sorting in descending order, the same area order as in the original image can be obtained in the rotated image 53, too. This is because even if rotation of the original image 51 has changed the absolute values of the first area feature values (areas in this case) of the areas from those in the original image, the relative relation between the first area feature values does not change. Finally, as for the sorted second area feature values, the original image 51 and the rotated image 53 have the same result. This is because even when the original image 51 has been rotated, the relative relation between the areas is held by the first area feature values, and the second area feature values (the average values of the brightness values in this case) do not change from those in the original image. According to the above-described embodiment, validation processing can fail if the image data I has undergone alteration between the image input apparatus and the image validation apparatus. The principle will be explained using an example shown in FIG. 10. FIG. 10 illustrates various kinds of data concerning an image obtained by altering the original image 51 in FIG. 5 (the upper right portion of the image data has been altered). As for the area separation result, the altered image obtains an area separation result different from that in the original image 51. This is because the brightness values in the altered portion have changed from those in the original image. Concerning the first area feature values as well, the sort result contains an area that does not exist in the original image. Consequently, sorted second area feature values different from those in the original image are obtained, and the validation processing fails. In this embodiment, feature values of different types are used as the first area feature value P1 and the second area feature value P2. Hence, even if a third party has found out how to obtain one of the feature values, alteration is difficult unless he/she finds out how to obtain the other feature value.

Note that limiting the feature values applied in this embodiment not to "feature values which do not change even after rotation of an image" but to "feature values which do not change even after enlargement/reduction and rotation of an image" makes it possible to impart tolerance of enlargement/reduction to the validation data generated in the embodiment. Examples of "the feature values which do not change even after enlargement/reduction and rotation of an image" are the average value of brightness information, the average value of color information, the variance of brightness information, and the variance of color information in each area.

In the above description, the area separation processing unit 12 separates image data into a plurality of areas. However, a case in which the area separation processing unit 12 does not separate image data into a plurality of areas is also possible. In this case, the entire image is regarded as one area. Since the area order need not be sorted, the plurality of area feature values are unnecessary. That is, one area feature value is calculated for the whole image, and validation data is generated based on it. The type of area data and the method of generating validation data from the area feature value are the same as those described above. Hence, in this case, for example, the area separation processing unit 12, first area feature value calculator 13, and area order sorter 15 in FIG. 1A are unnecessary.

Figure 11:
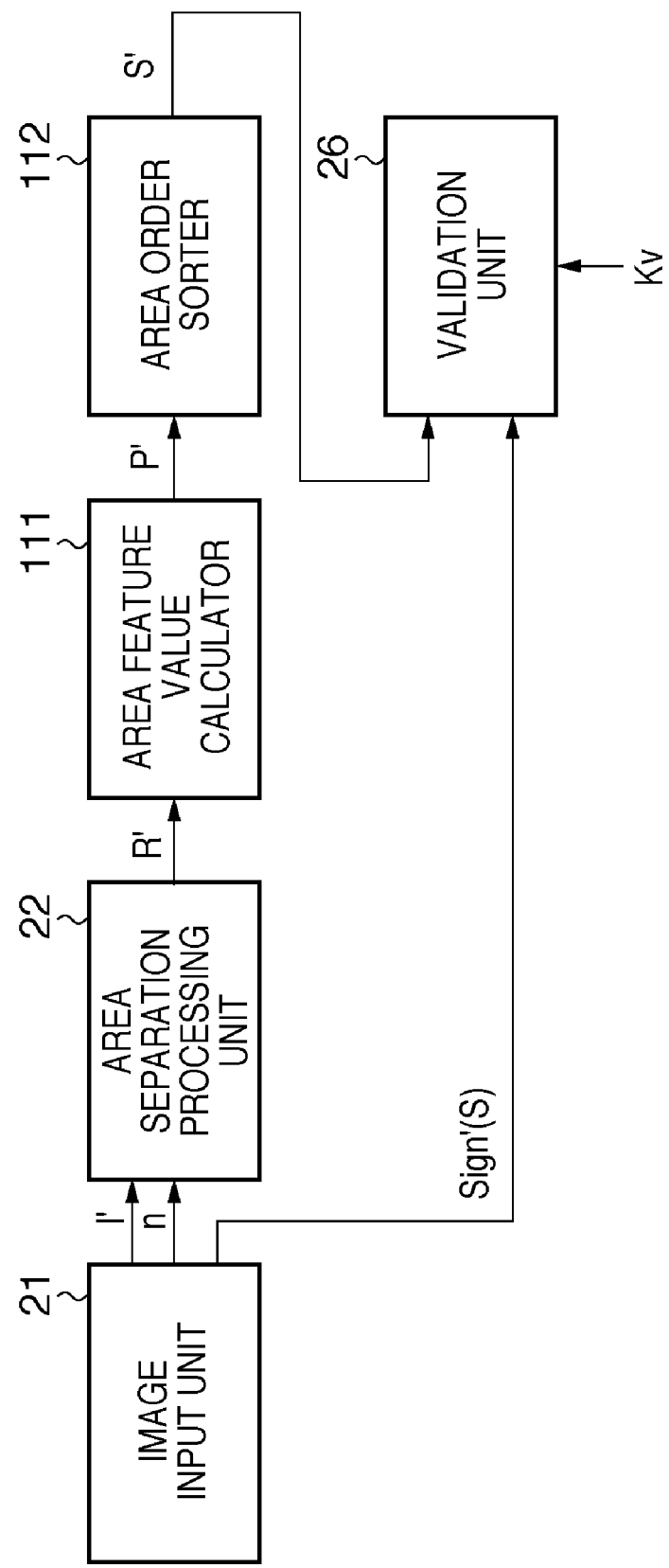
FIG. 11 is a block diagram for explaining the arrangement of an image validation apparatus according to a modification of the first embodiment.
Figure 16:
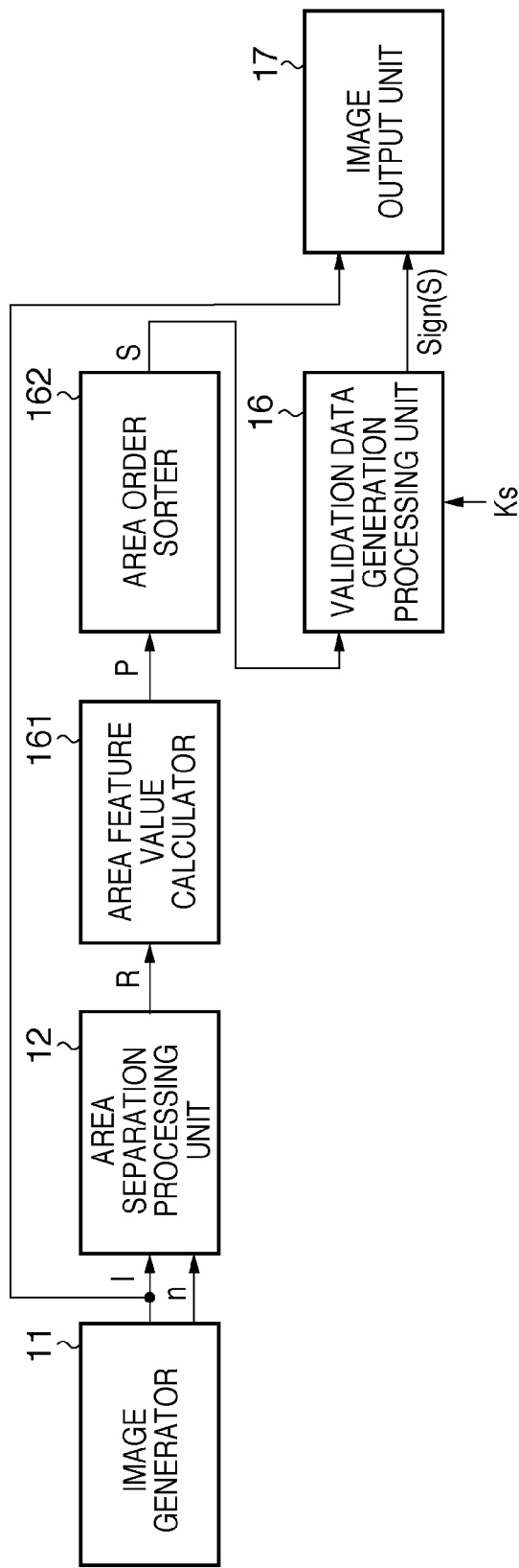
FIG. 16 is a block diagram for explaining the arrangement of an image input apparatus according to the modification of the first embodiment.

In the above-described embodiment, the first area feature value P1 and the second area feature value P2 calculated by the first area feature value calculator 13 and the second area feature value calculator 14, respectively, are feature values of different types. As a modification, feature values of the same type may be used. Using feature values of the same type decreases the numbers of components and processes. An arrangement using feature values of the same type will be explained below with reference to FIGS. 11 and 16. The arrangement of an image input apparatus according to this modification will be described first with reference to FIG. 16. FIG. 16 is a block diagram for explaining the functions of the image input processing apparatus according to this modification. The modification is different from the first embodiment in an area feature value calculator 161 and an area order sorter 162. Except the area feature value calculator 161 and the area order sorter 162, the components and processes are the same as in the first embodiment, and a description thereof will not be repeated. The area feature value calculator 161 has the same arrangement as that of the first area feature value calculator 13 or the second area feature value calculator 14 of the first embodiment. The area order sorter 162 receives area feature values P calculated by the area feature value calculator 161 of the preceding stage, sorts the area feature values P, and outputs sorted area feature values S. That is, the area feature values P are directly sorted in this modification, although the area order sorter 15 of the first embodiment sorts the first area feature values P1 using the second area feature values P2. The arrangement of an image validation apparatus according to this modification will be described next with reference to FIG. 11. FIG. 11 is a block diagram for explaining the functions of the image validation apparatus according to this modification. The modification is different from the first embodiment in an area feature value calculator 111 and an area order sorter 112. Except the area feature value calculator 111 and the area order sorter 112, the components and processes are the same as in the first embodiment, and a description thereof will not be repeated. The arrangement and process of the area feature value calculator 111 are the same as those of the above-described area feature value calculator 161 in FIG. 16. The arrangement and process of the area order sorter 112 are the same as those of the above-described area order sorter 162 in FIG. 16. Note that various feature values are applicable as the area feature values P to be calculated by the area feature value calculators 111 and 161 if they do not change even after rotation of image data. Examples have been described in the above embodiment. As described above, according to the modification, feature values of the same type are used for sorting and validation data. This makes the numbers of components and processes less than in the first embodiment.

In the above-described embodiment, the area order sorter 15 in FIG. 1 outputs the sorted second area feature values S, and the validation data generation processing unit 16 receives them to generate the validation data Sign(S). As a modification, the magnitude relation between the area feature values included in the second area feature values S may be calculated, and validation data may be generated using the calculated magnitude relation. An example will be described below in which validation data is generated using the magnitude relation between the area feature values. The arrangement of an image input apparatus according to this modification will be explained first with reference to FIG. 1B. Except a magnitude relation calculator 18, the components and processes in FIG. 1B are the same as in FIG. 1A described above, and a description thereof will not be repeated. The magnitude relation calculator 18 receives the sorted second area feature values S output from the area order sorter of the preceding stage, calculates the magnitude relation between the area feature values based on the received sorted second area feature values S, and outputs a calculated magnitude relation O. The validation data generation processing unit 16 of the succeeding stage receives the output magnitude relation O and calculates validation data Sign(O). Magnitude relation calculation processing to be executed in the magnitude relation calculator 18 will be described here. The magnitude relation calculation processing of this modification calculates the magnitude relation between the area feature values included in the received sorted second area feature values S by if $S(i) > S(j)$ then $O(k)=1$ else $O(k)=0$ (1)

where S(x) is an area feature value included in the sorted second area feature values S, i and j are indices representing the second area feature values S, O(x) is the calculated magnitude relation, and k is an index representing the magnitude relation.

A detailed example of the magnitude relation calculation processing will be explained using the example shown in FIG. 5. In the example of FIG. 5, the sorted second area feature values are "S(0)=130, S(1)=180, S(2)=190, S(3)=10, S(4)=50, S(5)=100". When O(k) corresponding to i=0 and j=1 to 5 are calculated using Expression (1), "O(1)=0, O(2)=0, O(3)=1, O(4)=1, O(5)=1". The same processing as described above is executed for all combinations of i and j. Thus obtained values O(k) are concatenated and output as the magnitude relation O. Note that the magnitude relation may not be calculated for all combinations of i and j. O(k) may be calculated for combinations selected at random using random numbers or predetermined combinations.

The arrangement of an image validation apparatus according to this modification will be explained next with reference to FIG. 2B. Except a magnitude relation calculator 27, the components and processes in FIG. 2B are the same as in FIG. 2A described above, and a description thereof will not be repeated. The magnitude relation calculation processing to be executed in the magnitude relation calculator 27 is the same as in the magnitude relation calculator 18 in FIG. 1B, and a description thereof will not be repeated.

The procedure of image capturing processing of the image input apparatus of this modification will be explained next with reference to FIG. 3B. The same step numbers as in FIG. 3A represent the same processes in FIG. 3B, and a description thereof will not be repeated. As shown in FIG. 3B, after area order sort processing in step S35, the magnitude relation calculator 18 calculates the magnitude relation O in step S38. Then, validation data generation processing is executed in step S36 based on the calculated magnitude relation.

Figure 4B:
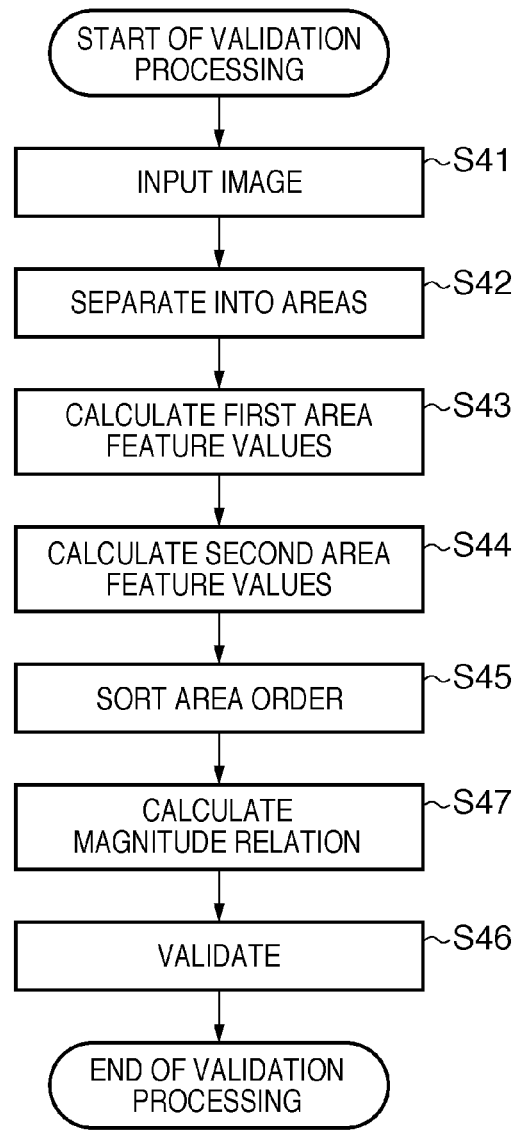

The procedure of validation processing of the image validation apparatus of this modification will be explained next with reference to FIG. 4B. The same step numbers as in FIG. 4A represent the same processes in FIG. 4B, and a description thereof will not be repeated. As shown in FIG. 4B, after area order sort processing in step S45, the magnitude relation calculator 27 calculates a magnitude relation O' in step S47. Then, validation processing is executed in step S46 using the calculated magnitude relation.

As described above, according to this modification, validation data is generated based on not the sorted second area feature values but the magnitude relation between them, thereby improving the tolerance. More specifically, validation (i.e., determining that "image data has not been altered") can succeed even when validation target image data has undergone various kinds of image processing such as γ correction and contrast correction as well as rotation and reduction. This is because when validation target image data has undergone γ correction or contrast correction, the sorted second area feature values themselves change, but the magnitude relation between them does not change.

The above explanation assumes that without alteration of an image, the image input apparatus and the image validation apparatus should obtain the same area separation result. For this purpose, in the first embodiment, the image input apparatus transmits the number of separated areas to the image validation apparatus such that the number of separated areas in the image validation apparatus becomes equal to that in the image input apparatus. However, the present invention is not limited to this. The image input apparatus and the image validation apparatus only obtain the same area separation result if there is no alteration of an image. For example, area separation is repeatedly executed. In accordance with the area separation result at the end of the first area separation, it may be determined whether to further execute or finish the area separation processing. In a second embodiment, a method will be described which determines, using the relation between area feature values obtained from the result of first area separation processing, whether to continue area separation processing.

Figure 13:
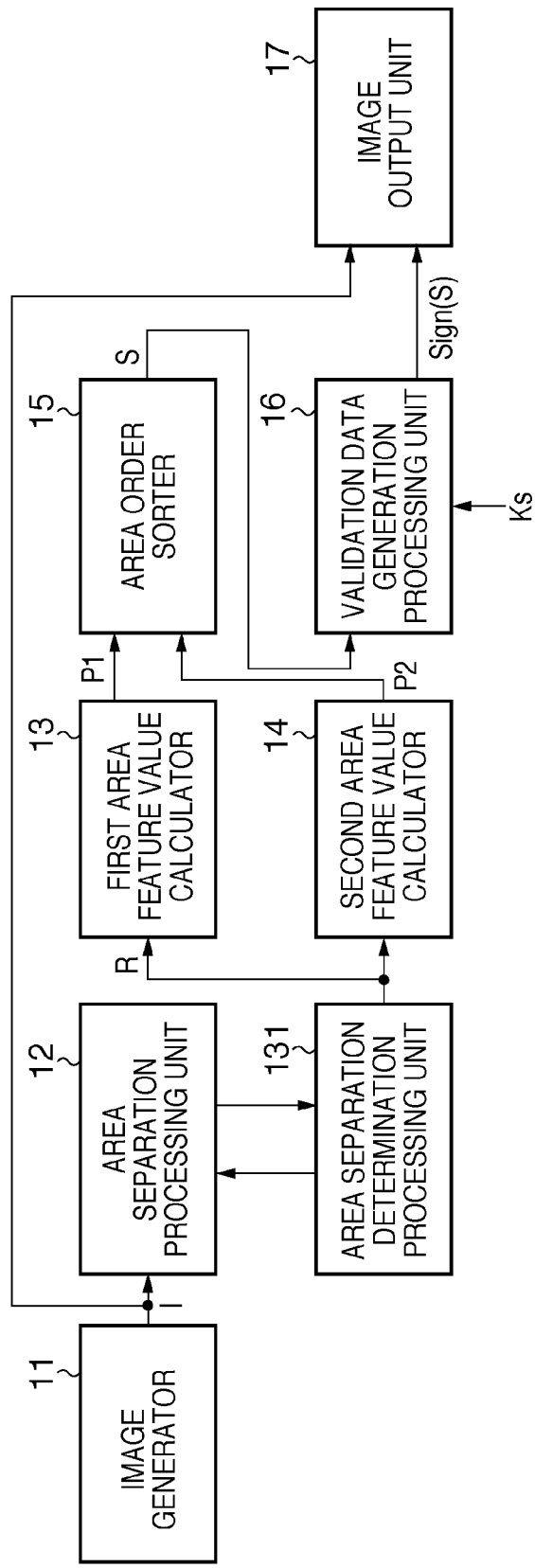
FIG. 13 is a block diagram showing the arrangement of an image input apparatus according to the second embodiment.

The function of an image input apparatus 81 applied to the embodiment will be described below with reference to FIG. 13. Note that a case will be explained below in which the above-described image input apparatus 81 is powered on, and the OS is loaded to a work memory 84. Image input processing to be explained here may be implemented by software processing. In that case, the above-described units should be regarded as the concepts of functions used for the processing. An area separation determination processing unit 131 is added, unlike the first embodiment. Except this, the components and processes are the same as in the first embodiment, and a description thereof will not be repeated. The area separation determination processing unit 131 determines whether an area separation result output from an area separation processing unit 12 of the preceding stage is appropriate. Upon determining that it is appropriate, the area separation determination processing unit 131 outputs an area separation result R to a first area feature value calculator 13 and a second area feature value calculator 14 of the succeeding stage. On the other hand, upon determining that the area separation result is not appropriate, the area separation determination processing unit 131 requests the area separation processing unit 12 of the preceding stage to execute the area separation processing again.

The procedure of processing in the area separation processing unit 12 and the area separation determination processing unit 131 according to this embodiment will be described below with reference to FIGS. 6A to 6C. First, the area separation processing unit 12 separates image data I (S61). The area separation determination processing unit 131 determines whether the first area feature value difference between the areas is larger than a predetermined threshold (S62). If it is determined that the difference is equal to or smaller than the threshold, the area separation processing ends. The area separation determination processing unit 131 outputs the area separation result R to the first area feature value calculator 13 and the second area feature value calculator 14 of the succeeding stage. Otherwise, the process returns to step S61 to execute the area separation processing again. Assume that in the above-described processing procedure shown in FIG. 6A, the area separation processing in step S61 is executed based on, e.g., the average value of the brightness values of the areas. In this case, an area in which the average value of the brightness values after area separation does not change from that before as a result of area separation in step S61 may not be separated by area re-separation in step S61 even if it is determined in step S62 that the feature value difference between areas is larger than the threshold. A modification considering such a situation will be explained with reference to FIG. 6B. Before area separation processing, a feature value list as shown in FIG. 6C is held in, e.g., a RAM 95 (FIG. 9) in the order of feature value application in advance. When area separation processing starts, the feature value registered first in the feature value list shown in FIG. 6C is set as the initial feature value (S63). In the example of FIG. 6C, "the average value of brightness values" is set as the initial feature value. A value "1" is substituted for the number n1 of areas (S64). Since area separation processing has never been executed at this stage, the entire image is regarded as one area, and the number of areas is set to "1". Using the initial feature value set in step S63, the image data I is separated into areas (S65). The number n2 of areas after area separation is calculated (S66). The area separation determination processing unit 131 determines whether the first area feature value difference between the areas is larger than a predetermined threshold (S62). If it is determined that the difference is equal to or smaller than the threshold, the area separation processing ends. The area separation determination processing unit 131 outputs the area separation result R to the first area feature value calculator 13 and the second area feature value calculator 14 of the succeeding stage. If it is determined that the difference is larger than the threshold, the process advances to step S67. In step S67, the area separation determination processing unit 131 calculates the difference between the number n1 of areas and the number n2 of areas calculated in steps S64 and S66, and determines whether the calculated difference is smaller than the threshold. Upon determining that it is smaller than the threshold, the feature value registered next in the above-described feature value list is set (S68). The process advances to step S69. In the example of FIG. 6C, "the variance of brightness values" next to "the average value of brightness values" is set as the feature value. Upon determining that the difference is equal to or larger than the threshold, the process advances to step S69. In step S69, the number n2 of areas is substituted for n1. The process then returns to step S65.

Figure 7:
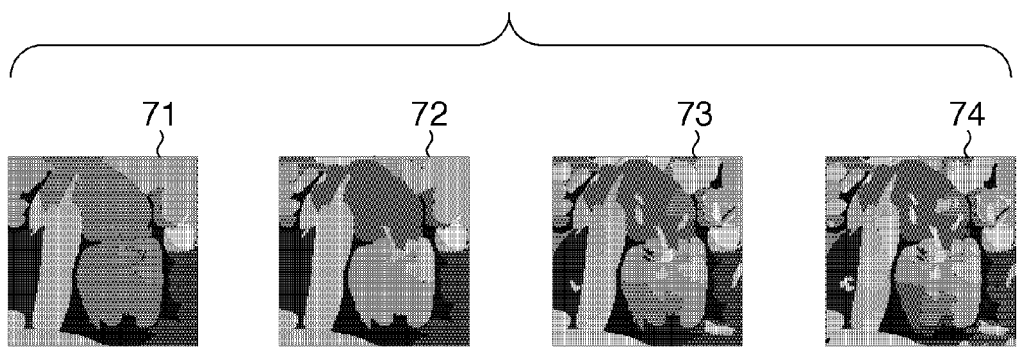
FIG. 7 is a view for explaining an example of area separation processing according to the second embodiment.

According to the processing procedure shown in FIG. 6B, if the user attempts to do area separation using, e.g., the average value of brightness values, but no further area separation is possible, area separation processing can be performed using another feature value such as the variance of brightness values. This allows to further separate even an area which cannot be separated using a single feature value. Note that the overall processing procedure of this embodiment is obtained by replacing step S32 in FIG. 3A with the processing in FIG. 6A or 6B. An example of area separation processing of this embodiment will be explained below with reference to FIG. 7. Referring to FIG. 7, reference numerals 71, 72, 73, and 74 denote area separation results. If the area separation processing by the area separation processing unit 12 is a separation approach, the area separation result 71 is obtained by the first area separation processing. In the area separation result 71, the area difference between the areas is calculated. When the maximum value of the area difference is equal to or larger than a predetermined threshold, area separation is further executed to obtain the area separation result 72. This processing is repeated to obtain the area separation results 73 and 74. The area separation result 74 in which the maximum value of the area difference is equal to or smaller than the predetermined threshold is output as the final area separation result. Note that this embodiment uses the area difference for the area separation determination processing. Also usable is the above-described feature value applicable to the first area feature value, information concerning areas such as the number of areas included in an area separation result, or a relation such as a difference or a ratio between these pieces of information.

The function of an image validation apparatus 91 applied to the embodiment will be described below with reference to FIG. 14. Note that a case will be explained below in which the above-described image validation apparatus 91 is powered on, and the OS is loaded to the RAM 95. Image validation processing to be explained here may be implemented by software processing. In that case, the above-described units should be regarded as the concepts of functions used for the processing. An area separation determination processing unit 141 is added, unlike the first embodiment. Except this, the components and processes are the same as in the first embodiment, and a description thereof will not be repeated. The internal processing of the area separation determination processing unit 141 is the same as that of the above-described area separation determination processing unit 131 of this embodiment. The processing procedure of an area separation processing unit 22 and the area separation determination processing unit 141 according to this embodiment is also the same as in FIG. 6A or 6B. The overall processing procedure of this embodiment is obtained by replacing step S42 in FIG. 4A with the processing in FIG. 6A or 6B.

As described in this embodiment, area separation considering the feature value difference between areas makes alteration more difficult. For example, if an attacker has found out how to obtain the feature values, a portion having a large feature value difference between areas is open to alteration without influence on the area sort result. However, when area separation is repeated until the feature value difference between areas almost becomes equal to or smaller than a threshold, the room for alteration can be smaller.

The above-described embodiments assume that the image data I generated by the image generator 11 is still image data such as the photo 51 in FIG. 5. However, the present invention is not limited to this and is also applicable to a case wherein the image data I is document data or compound data including document data and image data. For example, if the image data I is document data or compound data, the area separation processing unit 12 in FIG. 1A or 1B separates the document data or compound data for each attribute. Attributes are text, photo, table, and line. A detailed example of the area separation processing technique is processing known in Japanese Patent Laid-Open No. 06-068301 (U.S. Pat. No. 5,680,478). In this example, sets of black pixel clusters and white pixel clusters are extracted from image data. Based on feature amounts such as the shape, area, and set state of each set, areas are extracted with feature names such as text, picture, graphic, table, frame, and line.

Figure 15A:
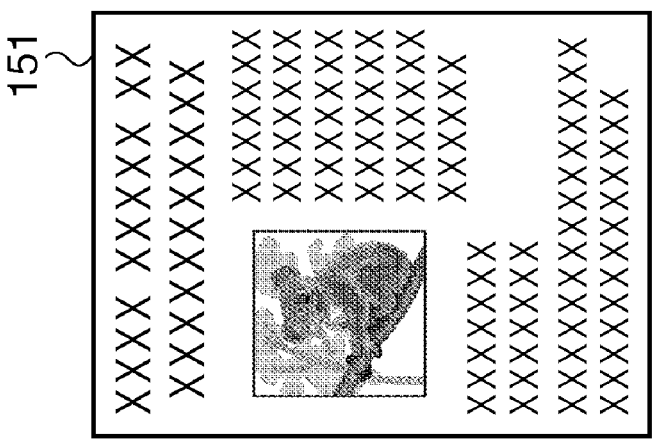
FIGS. 15A to 15C are views for explaining examples of area separation processing according to another embodiment.
Figure 15B:
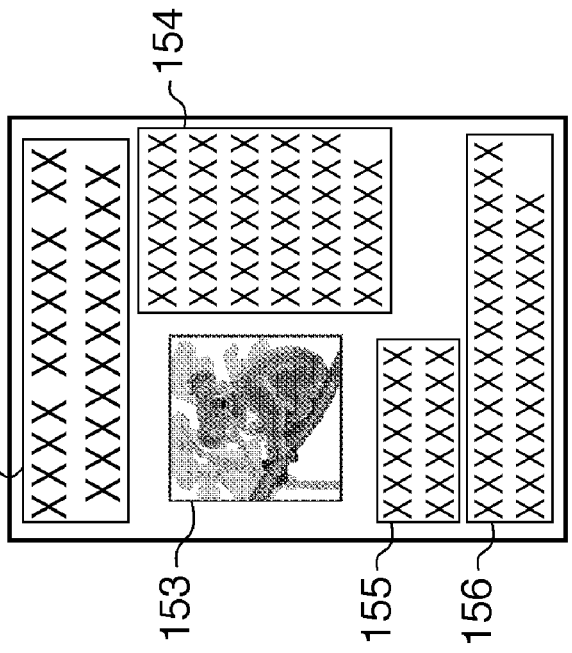
Figure 15C:
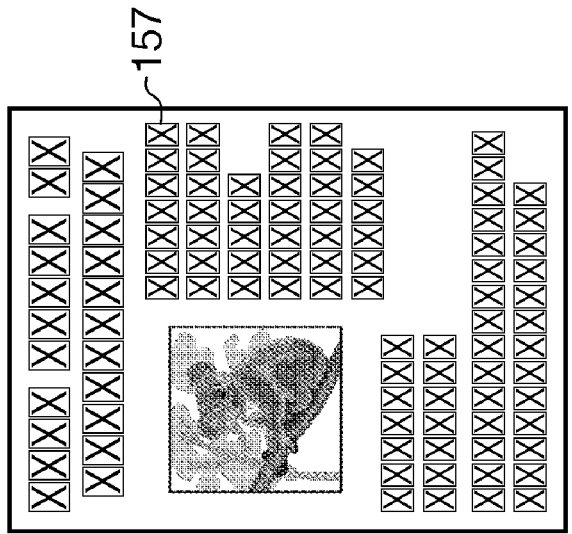

For example, when area separation processing is performed for compound data 151 shown in FIG. 15A, a result shown in FIG. 15B is obtained. Areas 152, 154, 155, and 156 are text areas, and an area 153 is a color photo area based on their attributes. In each area determined as a text area, each character may be extracted as shown in FIG. 15C, and each extracted character (e.g., character 157) may be set as one area. Processing of compound data may be switched by separating the data into areas according to attributes, as shown in FIG. 15B, or separating the data up to character areas, as shown in FIG. 15C. In this case, the operator of the image input apparatus gives an instruction to execute area separation processing using a user interface (not shown) so that area separation processing is executed based on the instruction of the operator. The above-described area, peripheral length, degree of complexity, degree of elongation, or the average value or variance of brightness information or color information of an area is applicable as the feature value to be calculated by the first area feature value calculator 13 or the second area feature value calculator 14 from an area determined to be a text area. Also applicable is a result obtained by recognizing characters included in each text area using a technique such as OCR. According to this embodiment, when the operator of the image input apparatus wants to detect alteration of the layout of compound data, validation data can be generated by, e.g., separating the compound data into areas according to attributes and calculating the area of each separated area. If the operator wants to detect alteration of the contents of a document contained in compound data, validation data can be generated by, e.g., separating the compound data up to character areas and recognizing the characters in each separated text area.

Note that each of the above-described embodiments merely represents a detailed example in practicing the present invention and is not intended to limit the technical scope of the present invention. That is, various changes and modifications can be made without departing from the spirit and scope of the present invention. The present invention can take a form of, for example, a system, apparatus, method, program, or storage medium (recording medium). More specifically, the present invention is applicable to a system including a plurality of devices (e.g., host computer, interface device, scanner, and web application) or an apparatus including a single device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-304606, filed Nov. 28, 2008 and 2009-204721, filed Sep. 4, 2009, which are hereby incorporated by reference herein in their entirety.

What is claimed is:

1. An apparatus for generating validation data to validate alteration of image data, comprising:
    a separation unit which separates an image represented by the image data into a plurality of areas;
    a calculator which calculates a first area feature value and a second area feature value of each area, the first area feature value and the second area feature value being unchangeable when each area rotates;
    a sorter which sorts the second area feature values corresponding to the plurality of areas based on the first area feature values; and
    a validation data generator which generates, based on the sorted second area feature values, validation data to validate alteration of the image data.

2. The apparatus according to claim 1, wherein the first area feature value and the second area feature value are feature values of different types.

3. The apparatus according to claim 2, wherein the first area feature value is an area of an area, and the second area feature value is an average density of an area.

4. The apparatus according to claim 1, wherein the first area feature value and the second area feature value are feature values of the same type.

5. The apparatus according to claim 4, wherein each of the first area feature value and the second area feature value is an area of an area.

6. The apparatus according to claim 1, wherein the first area feature value and the second area feature value are feature values that do not change when the image data is enlarged or reduced.

7. The apparatus according to claim 6, wherein each of the first area feature value and the second area feature value is an average density of an area.

8. The apparatus according to claim 1, wherein the validation data generator generates one of a digital signature and a MAC (Message Authentication Code) from a sort result.

9. A method of controlling an apparatus for generating validation data to validate alteration of image data, the method comprising:
    separating an image represented by the image data into a plurality of areas;
    calculating a first area feature value and a second area feature value of each area, the first area feature value and the second area feature value being unchangeable when each area rotates;
    sorting the second area feature values corresponding to the plurality of areas based on the first area feature values; and
    generating, based on the sorted second area feature values, validation data to validate alteration of the image data.

10. A non-transitory computer-readable storage medium storing a computer program which causes a computer to execute a method of controlling an apparatus for generating validation data to validate alteration of image data, the method comprising:
    separating an image represented by the image data into a plurality of areas;

calculating a first area feature value and a second area feature value of each area, the first area feature value and the second area feature value being unchangeable when each area rotates;

sorting the second area feature values corresponding to the plurality of areas based on the first area feature values; and generating, based on the sorted second area feature values, validation data to validate alteration of the image data.

11. The method according to claim 9, wherein the first area feature value and the second area feature value are feature values of different types.

12. The method according to claim 11, wherein the first area feature value is an area of an area, and the second area feature value is an average density of an area.

13. The method according to claim 9, wherein the first area feature value and the second area feature value are feature values of the same type.

14. The method according to claim 13, wherein each of the first area feature value and the second area feature value is an area of an area.

15. The method according to claim 9, wherein the first area feature value and the second area feature value are feature values that do not change.

16. The method according to claim 15, wherein each of the first area feature value and the second area feature value is an average density of an area.

17. An information processing apparatus for validating alteration of image data with validation data, the information processing apparatus comprising:

a separation unit which separates an image represented by the image data into a plurality of areas;

a calculator which calculates a first area feature value and a second area feature value of each area, the first area feature value and the second area feature value being unchangeable even when each area rotates;

a sorter which sorts the second area feature values corresponding to the plurality of areas based on the first area feature values; and a validation unit which validates alteration of the image data based on the second area feature values sorted by the sorter and the validation data.

18. The apparatus according to claim 17, wherein the first area feature value and the second area feature value are feature values of different types.

19. The apparatus according to claim 17, wherein the first area feature value and the second area feature value are feature values of the same type.

20. The apparatus according to claim 17, wherein the first area feature value and the second area feature value are feature values that do not change when the image data is enlarged or reduced.

21. A method of controlling an information processing apparatus for validating alteration of image data with validation data, the method comprising:

separating an image represented by the image data into a plurality of areas;

calculating a first area feature value and a second area feature value of each area, the first area feature value and the second area feature value being unchangeable even when each area rotates;

sorting the second area feature values corresponding to the plurality of areas based on the first area feature values; and validating alteration of the image data based on the sorted second area feature values and the validation data.

22. A non-transitory computer-readable storage medium storing a computer program which causes a computer to execute a method of controlling an information processing apparatus for validating alteration of image data with validation data, the method comprising:

separating an image represented by the image data into a plurality of areas;

calculating a first area feature value and a second area feature value of each area, the first area feature value and the second area feature value being unchangeable even when each area rotates;

sorting the second area feature values corresponding to the plurality of areas based on the first area feature values; and validating alteration of the image data based on the sorted second area feature values and the validated data.

* * * * *